(12) United States Patent
Miller

(10) Patent No.: US 10,198,388 B2
(45) Date of Patent: Feb. 5, 2019

(54) DATA STORAGE SYSTEM WITH PRE-BOOT INTERFACE

(71) Applicant: Seagate Technology LLC, Cupertino, CA (US)

(72) Inventor: Michael Howard Miller, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 1355 days.

(21) Appl. No.: 14/032,382

(22) Filed: Sep. 20, 2013

(65) Prior Publication Data

US 2015/0089109 A1  Mar. 26, 2015

(51) Int. Cl.
*G06F 13/40* (2006.01)
*G06F 3/06* (2006.01)

(52) U.S. Cl.
CPC ............ *G06F 13/4027* (2013.01); *G06F 3/06* (2013.01)

(58) Field of Classification Search
None
See application file for complete search history.

(56) References Cited

U.S. PATENT DOCUMENTS

| | | | |
|---|---|---|---|
| 6,363,492 B1 * | 3/2002 | James, Jr. | G06F 11/1417 713/2 |
| 6,505,278 B1 * | 1/2003 | Piwonka | G06F 9/4401 707/999.202 |
| 7,197,657 B1 | 3/2007 | Tobias | |
| 7,581,133 B2 | 8/2009 | Lambert et al. | |
| 7,716,515 B2 | 5/2010 | Shih | |
| 7,911,381 B2 | 3/2011 | Farmer | |
| 7,930,533 B1 * | 4/2011 | Guo | G06F 9/4416 709/222 |
| 8,230,209 B1 * | 7/2012 | Streuter | G06F 9/441 713/1 |
| 8,392,001 B1 | 3/2013 | Isik et al. | |
| 8,656,490 B1 * | 2/2014 | Sobel | H04L 61/1511 709/227 |
| 9,317,268 B2 * | 4/2016 | Levijarvi | G06F 8/61 |
| 9,367,515 B1 * | 6/2016 | Myers | G06F 15/177 |
| 2004/0003123 A1 | 1/2004 | Kwon | |
| 2007/0186086 A1 * | 8/2007 | Lambert | G06F 8/65 713/1 |
| 2010/0024001 A1 * | 1/2010 | Campbell | G06F 21/85 726/2 |
| 2011/0125939 A1 * | 5/2011 | Miyauchi | G06F 1/1632 710/104 |
| 2013/0031390 A1 * | 1/2013 | Smith, III | G06F 1/206 713/320 |
| 2013/0340977 A1 * | 12/2013 | Singleton | F28D 15/02 165/104.21 |

* cited by examiner

*Primary Examiner* — Henry Tsai
*Assistant Examiner* — Christopher A Bartels
(74) *Attorney, Agent, or Firm* — Hall Estill Attorneys at Law

(57) ABSTRACT

A data storage system and associated method of using may generally have at least a data storage device that has independent first and second interfaces respectively connecting the data storage device to a host controller and an auxiliary controller. The auxiliary controller can be configured to provide system information to the data storage device prior to a synchronized connection being established between the data storage device and the host controller.

20 Claims, 4 Drawing Sheets

DATA STORAGE SYSTEM WITH PRE-BOOT INTERFACE

SUMMARY

Various embodiments are generally directed to a data storage system.

In accordance with some embodiments, a data storage system may generally have at least a data storage device that has independent first and second interfaces respectively connecting the data storage device to a host controller and an auxiliary controller. The auxiliary controller can be configured to provide system information to the data storage device prior to a synchronized connection being established between the data storage device and the host controller.

DETAILED DESCRIPTION

As electronics devices have become more complex and sophisticated, the speed at which device components can boot from a nonoperational state to an operational state plays an important role. Increased boot times can be compounded in multi-component data storage systems to create delays and operational inefficiencies. During a systems boot, operational components wait on booting, nonoperational components to provide full system capabilities. For example, data storage devices may wait for one or more upstream network components, like a network time server, to boot and synchronize before a real time clock value is delivered and the data storage device can fully function. In the event the upstream network components are unavailable, the downstream data storage devices can be delayed or operate inaccurately. Such inefficiencies illustrate the ongoing industry goal of allowing different components to load and become fully operational at different times, regardless of the components position in an interconnected network.

With these industry issues in mind, various embodiments can be directed to a data storage device with independent first and second interfaces that are respectively connected to a host controller and auxiliary controller; with the auxiliary controller configured to provide pre-boot system information to the data storage device prior to a synchronization connection between the host controller and the data storage device. The supply of pre-boot system information, like a real time clock value and personalized user data, can allow the data storage device to provide accurate, immediate operation to a network once the synchronization connection is established regardless of whether upstream network components are online. In contrast, the data storage device would be forced to guess about system information to fully boot, which could create system accuracy issues, or wait for upstream components to boot and establish a synchronized connection to receive system information. As such, the use of independent interfaces allows for the concurrent establishment of on-demand data storage device booting and operational connections with upstream network components.

Figure 1:
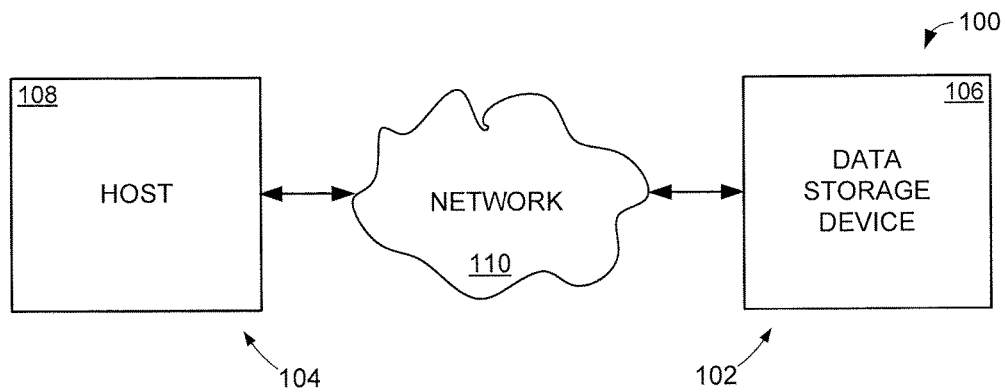
FIG. 1 is a block representation of an example data storage system configured in accordance with various embodiments.

FIG. 1 generally illustrates a block representation of an example data storage system 100 that can utilize local 102 and remote 104 hardware in accordance with various embodiments. While not limiting, the local hardware 102 may have one or more components, like the displayed data storage device 106, physically located in a physical structure, such as a chassis. Conversely, the remote hardware 104 can include any number of components, such as a processor and memory array, which are physically present in distant locations and interconnected to form a host 108 that communicates with and controls the local hardware 102 via a network fabric 110.

For purposes of this disclosure, the term "remote" will be understood to mean a separation of electrical components. In FIG. 1, any number of controllers can be utilized and considered remote to the data storage device 106. As another non-limiting example, the data storage device 106 can be configured with control circuitry within its physical housing that could be considered local while other controllers physically mounted in the same chassis would be considered remote to the data storage device 106 due to the interconnection of the host controllers through the network 110. Hence, in a data storage environment where multiple electrical components are interchangeably mounted in a common chassis, each individual electrical component is remote to the separate components due at least to interconnection via the network.

Figure 2A:
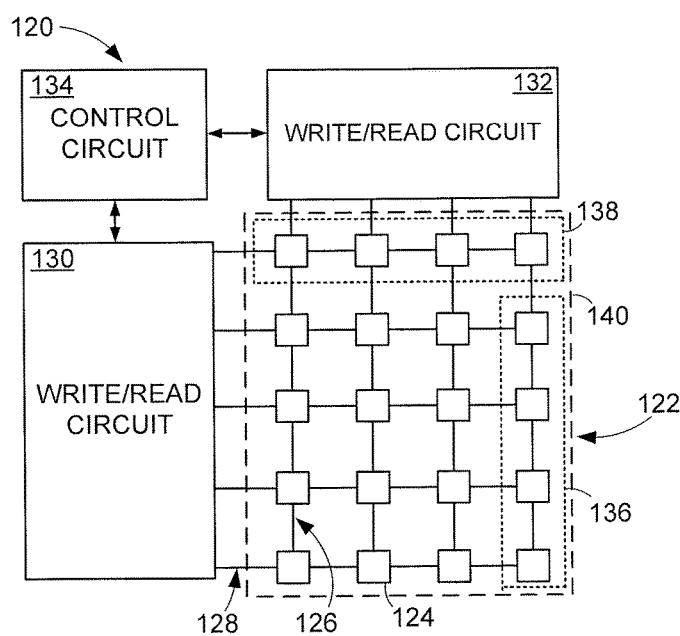
FIGS. 2A and 2B respectively illustrate different types of data storage devices that may be used in the data storage system of FIG. 1.
Figure 2B:
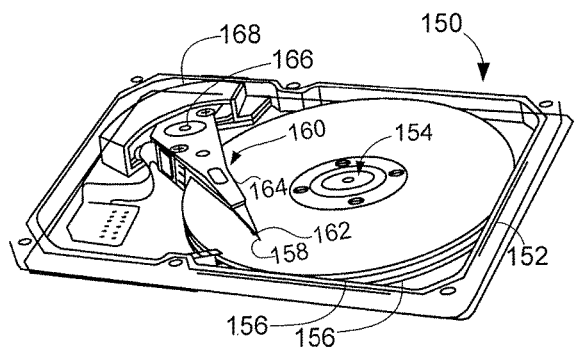

The data storage device 106 may be configured in various embodiments to service an unlimited variety of data storage environments. Such environments may comprise numerous separate data storage devices that may have common or uncommon types, capacities, and speeds. FIGS. 2A and 2B respectively illustrate different types of data storage devices that may be used exclusively or concurrently in the data storage system 100 of FIG. 1.

In FIG. 2A, a block representation of a portion of an example solid state data storage device 120 is displayed as constructed and operated in accordance with some embodiments to provide a data array 122 along with various data programming, evaluation, and reading circuitry that can be a part or the entirety of a data storage device. The data array 122, as shown, can have a number of non-volatile memory cells 124 arranged in rows and columns that can be characterized as a cross-point array. One or more write/read circuits 130 and 132 can individually or concurrently function with a control circuit 134 control data being written to and read from selected memory cells 124 arranged in sectors 136, pages 138, blocks 140, and garbage collection units.

FIG. 2B shows a hard disk drive data storage device 150 that has substantially sealed housing formed from a base deck 152 and top cover. An internally disposed spindle motor 154 is configured to rotate a number of magnetic storage media 156. The media 156 are accessed by a corresponding array of data transducers (read/write heads) that are each supported by a head gimbal assembly (HGA) 158. Each HGA 158 can be supported by a head-stack assembly 160 ("actuator") that includes a flexible suspension 162, which in turn is supported by a rigid actuator arm 164. The actuator 164 may pivot about a cartridge bearing assembly 166 through application of current to a voice coil motor (VCM) 168. In this way, controlled operation of the VCM 168 causes the transducers to align with tracks (not shown) defined on the media surfaces to store data thereto or retrieve data therefrom.

The rotating data storage device 150 may be used individually and in conjunction with a solid state array, like the array 122 of FIG. 2A, in accordance with various embodiments as part of a hybrid data storage device. Such a hybrid device may selectively utilize the various aspects of the solid state and rotating data storage environments to optimize data throughput and reliability. For example, the solid state device 120 may store long-term data while the rotating data storage device 150 stores data that is often rewritten and updated to reduce the wear and resistance variation that can occur in solid state memory cells after repeated write/erase cycles.

Regardless of the number, type, capacity, and speed of the data storage devices present and interconnected with a host controller, such as controller 108 of FIG. 1, each device may operate as a server by distributing data to one or more separate destinations. For instance, a first data storage device may conduct server operation by concurrently distributing data to multiple virtual machines while a second data storage device operates as a micro-server by providing data to a separate client and network destinations concurrently. The use of a data storage device as a server or micro-server in a network environment echoes the sophistication of modern networking technology where a variety of components in a network can operate to provide data to multiple clients.

Figure 3:
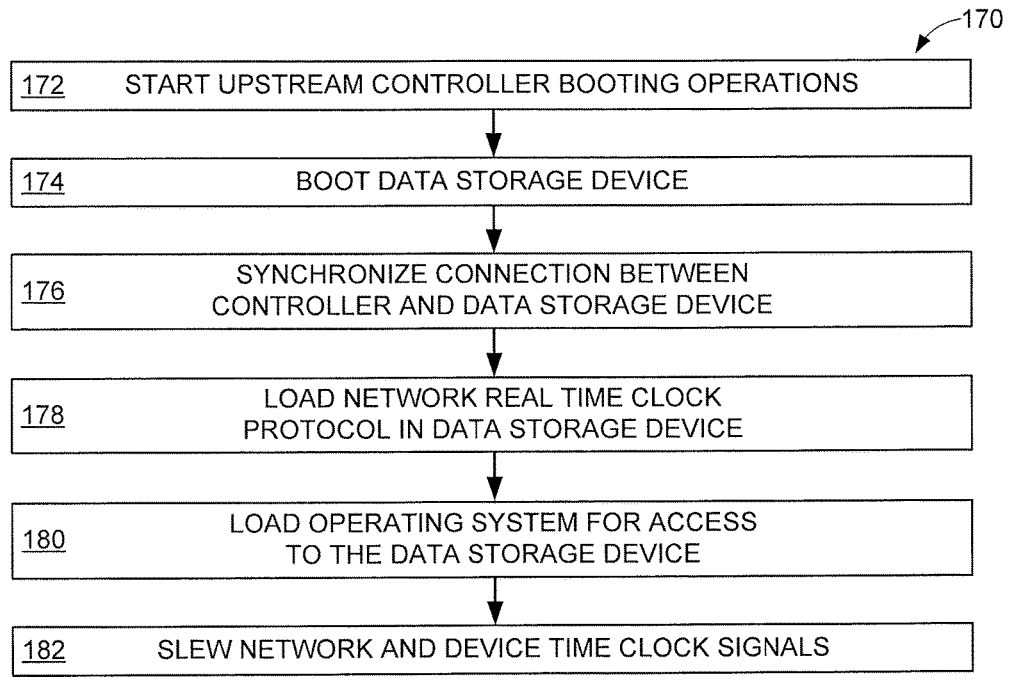
FIG. 3 maps an example device booting routine that may be carried out in accordance with some embodiments.

With data storage devices operating to provide data to others, the booting time of the data storage device has been placed at a premium. FIG. 3 provides a flowchart of an example network booting sequence 170 that illustrates some of the challenges associated with operating a data storage device as a server. Step 172 starts various booting operations in an upstream network controller, such as controller 108 of FIG. 1, which may perform any number of operations like self-tests, software loading, and executing boot loaders. At the conclusion of, or concurrently with, step 172, step 174 can boot one or more data storage devices interconnected to the upstream controller as part of a network.

The booting of the data storage device in step 174 can conduct similar or dissimilar operations compared to the upstream controller with some of those operations requiring a synchronized connection with the upstream controller to receive network data like network time and command queue logs. The occasion where the data storage device is waiting for the upstream controller to boot to a point where a synchronized connection between the data storage device and network can be established in step 176 illustrates the inefficiency of the serial booting of network components.

With the identification of such inefficiency, data storage devices can predict certain network data like network time in order to be available for full operation once the synchronized connection is formed in step 176. However, the inefficiency can be compounded by the loading of network data like real time clock protocol in each data storage device in step 178, which may correspond with incorrect network data predictions and the rebooting of some aspects of the data storage device. In the event predicted network time is inaccurate, a simple rebooting would be impractical as prior operations have already been time stamped when step 176 synchronizes the network connection with the data storage device.

Next, step 180 loads the local operating system in the data storage device that may or may not require communication with upstream network components, such as a network time server. With the operating system at least partially loaded, step 182 provides a mechanism of slewing dissimilar network and predicted data storage device times together. Such slewing may allow correction of small deviations gradually over time so to not disrupt network or data storage device function, but large discrepancies between the predicted data storage and network time can substantially delay the loading of an operating system that accesses the data storage device in step 180. That is, booting the data storage device serially with the upstream controller can be inefficient in terms of time waiting for a synchronized connection to be established so that network data can be loaded, in terms of processing overhead needed to slew non-matching predicted and actual network times, and in terms of inadvertent errors and shutdowns corresponding to grossly inaccurate predicted and actual network times.

Figure 4:
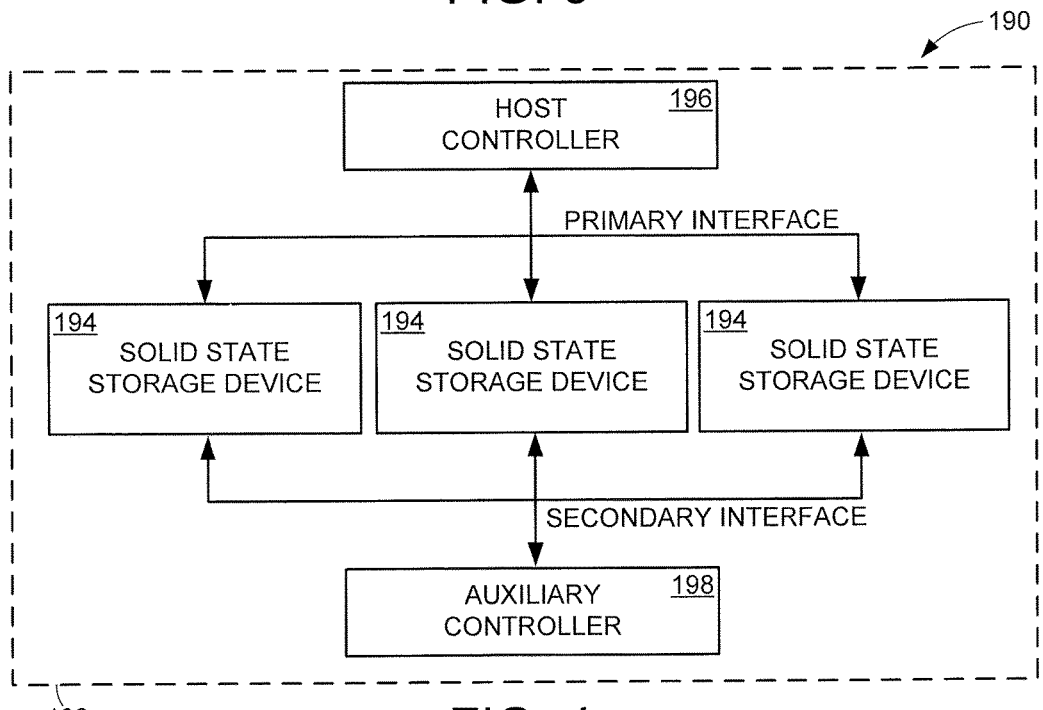
FIG. 4 displays a block representation of an example data storage system constructed and operated in accordance with various embodiments.

These issues have rendered a data storage device with at least two independent interfaces that can concurrently establish a synchronized connection to a network while loading system information data in the data storage device so that accurate, immediate data storage device network function can commence with the establishment of the synchronized connection. FIG. 4 generally displays a block representation of a data storage system 190 configured and operated in accordance with various embodiments to utilize at least two independent data storage device interfaces with appropriate protocol. As shown in a common chassis 192, a plurality of solid state storage devices 194 are each connected to a host controller 196 via a primary interface and an auxiliary controller 198 via a secondary interface.

It is to be understood that the exclusive use of solid state storage devices 194 is not required or limiting, and merely serves to illustrate one possible device configuration in the chassis 192. The independent connections from each storage device 194 to the respective host 196 and auxiliary 198 controllers allow for concurrent access, loading, and initialization of the storage devices 194 concurrently or sequentially with pre-boot system information. While the auxiliary controller 198 can be arranged in any number of manners to provide a variety of data, processing, and logic to the respective storage devices 194, some embodiments configure the auxiliary controller 198 as a source of network and system information.

Various embodiments configure the respective interfaces connecting the storage devices 194 to the host 196 and auxiliary 198 controllers as different types of interfaces, such as universal serial bus (USB), serial advanced technology attachment (SATA), and serial attached small computer system interface (SAS). For example, the primary interface from each storage device 194 to the controller 196 may be an Ethernet protocol while an I$^2$C protocol is used with the secondary interface to connect the storage devices 194 to the auxiliary controller 198. The ability to use different types of interfaces and protocol can save physical space and ensure enough processing speed and power is provided to allow unrestricted function and booting of the storage devices 194. Some embodiments also utilize different communication protocols in conjunction with the different interface types to customize the interface to the needs and function of the storage devices 194.

It is to be understood that throughout the present disclosure the term "pre-boot information" means information that is used by a system component without initializing booting operations. For example, pre-boot information like clock values, encryption keys, and network address information can be considered pre-boot information because they are used by a data storage device prior to booting operations such as the loading of an operating system and network communication protocol. As such, the pre-boot system information can be executed, stored, and delayed by a data storage device to initialize device function prior to connection with a network that enables full device operation.

Figure 5:
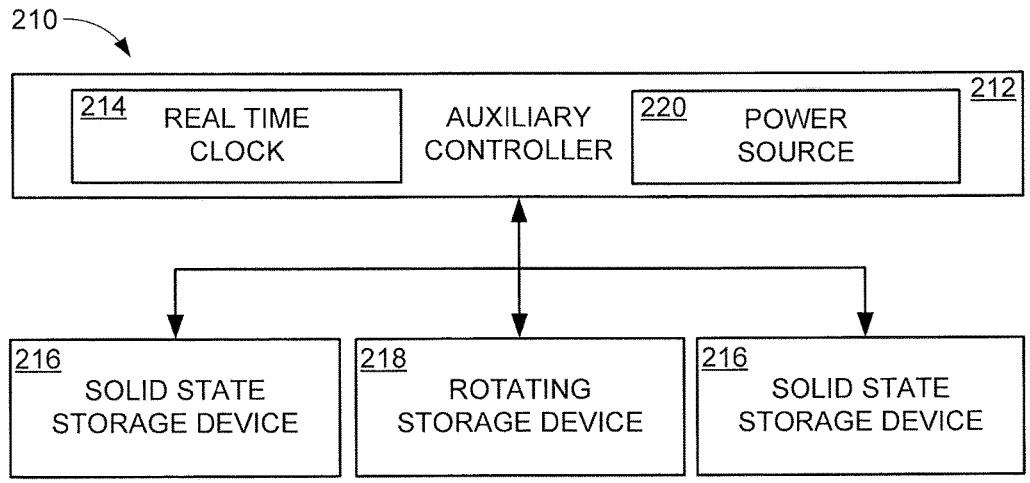
FIG. 5 illustrates a block representation of an example data storage system configured in accordance with assorted embodiments.

FIG. 5 is a block representation of a portion of an example data storage system 210 that configures an auxiliary controller 212 to provide pre-boot system information in the form of a real time clock value 214 that flows to both solid state 216 and rotating 218 data storage devices in parallel. Distributing pre-boot system information like a real time clock value from the auxiliary controller 212 to the plurality of storage devices 216 and 218 provides a clock value that will likely be close to or match a network time, which reduces processing overhead and errors associated with slewing mismatched storage device and network time. The central distribution of the real time clock value further allows the respective storage devices 216 and 218 to be physically smaller free of a real time clock and power source 220. Such reduction in size, processing, and errors allows each storage device 216 and 218 to be minimized and used in micro server architectures where physical space and processing utilization are at a premium.

Figure 6:
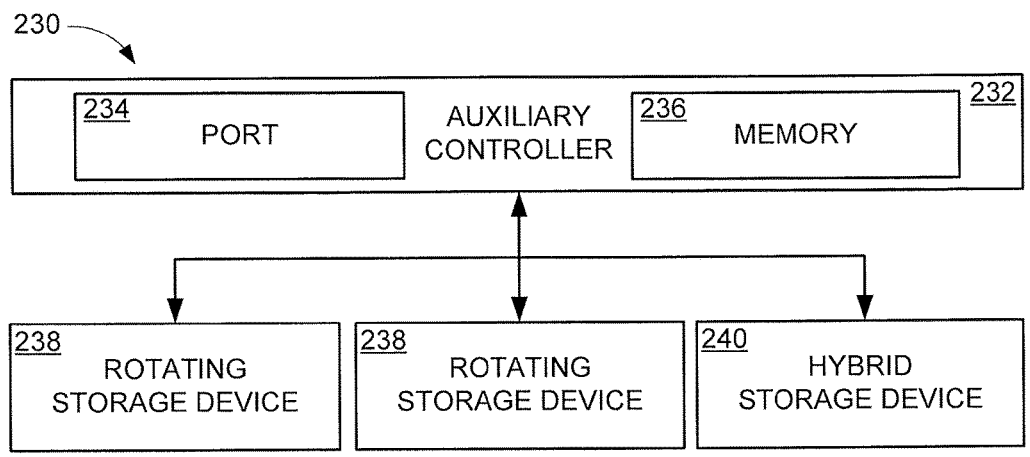
FIG. 6 shows a block a block representation of an example data storage system configured in accordance with various embodiments.

While the ability to provide a real time clock value to multiple storage devices can optimize device booting, the auxiliary controller 212 is not limited to the generation and supply of system information like a real time clock value. FIG. 6 displays a block representation of a portion of a data storage system 230 where the auxiliary controller 232 has an input/output port 234, such as a serial, USB, and MicroSD compatible interface, which correspond with logic that recognizes the port 234 being accessed and storing any relevant data in local memory 236. The availability of the port 234 and associated logic can allow a user to input pre-boot system information in the form of personalized data, such as passwords, encryption keys, and personalized static and dynamic network address information that may be requested by an operating system and loaded subsequent to a synchronized network connection to the rotating 238 and hybrid 240 storage devices.

The configuration of the port 234 and local memory 236 is not limited to that shown in FIG. 6 and can have any number of ports, volatile and non-volatile memory arrays, as well as system information like the real time clock 214 and power source 220 of FIG. 5. Regardless of the number, variety, and functions of the various aspects of the auxiliary controller 232 in addition to the port 234 and memory 236, the recognition, storage, and supply of the user provided pre-boot system information can increase storage device 238 and 240 booting accuracy and efficiency in transitioning from a non-operational state to a network operational state.

Figure 7:
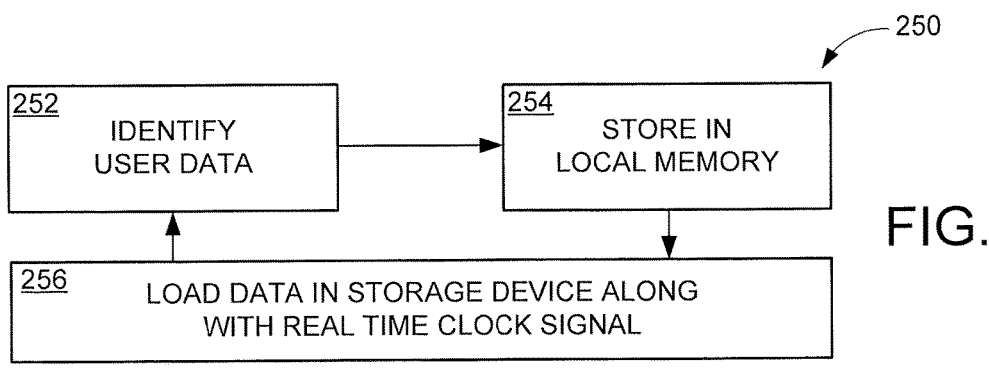
FIG. 7 is a map of an auxiliary controller logic performed in accordance with some embodiments.

FIG. 7 maps an example logic 250 that can be utilized by an auxiliary controller with an input/output port. The logic 250 begins with step 252 identifying the presence of user data in the local port. Investigation and classification of the user data may result in some or all of the data being stored in local memory in step 254. For example, the logic 250 may be configured to parse the available user data for information pertaining particularly to storage device and operating system booting, which may result in less than all the available user data being stored in local memory in step 254.

In step 256, the logic 250 proceeds to load the user data into one or more storage devices in accordance with what stage of booting the respective storage devices are executing. That is, the local memory may provide user data to different storage devices at different times, or not at all, in the event the storage devices are booting at different speeds or booting with different software packages. As shown in step 256, the logic 250 may concurrently provide system information like a real time clock value and associated protocol to the respective storage devices on-demand so that little or no delay in data storage booting is experienced.

Figure 8:
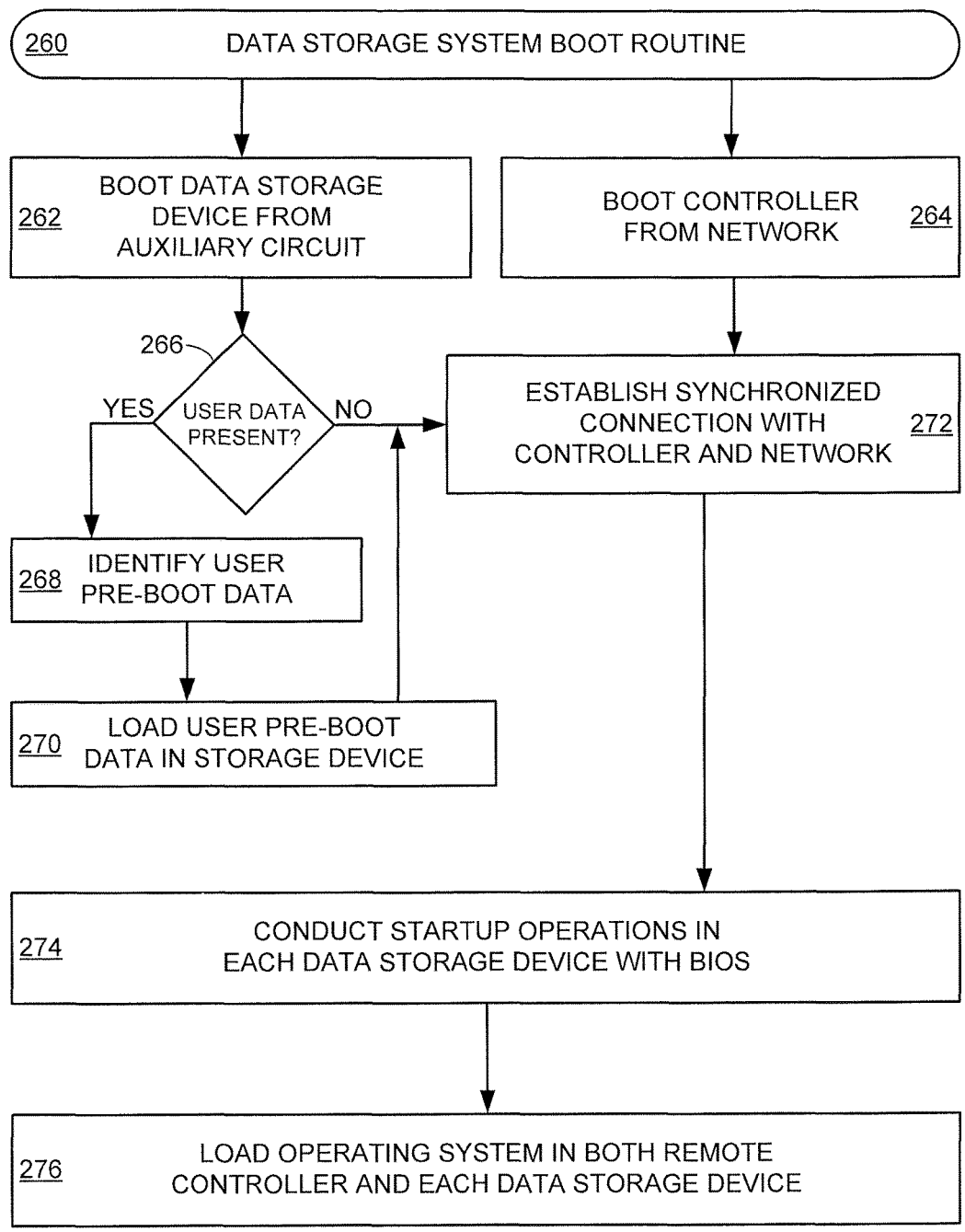
FIG. 8 provides a flowchart for an example data storage system boot routine conducted in accordance with various embodiments.

FIG. 8 provides a flowchart of an example data storage system boot routine 260 conducted in accordance with various embodiments. Initially, routine 260 concurrently boots at least one data storage device from an auxiliary controller in step 262 and boots at least one host controller from a network in step 264. In a non-limiting embodiment, the host controller, auxiliary controller, and a plurality of different types of data storage devices are all physically positioned in a common chassis and interconnected via a backplane containing multiple independent interfaces. The booting of the host controller in step 264 may conduct a multitude of network initialization operations via communications with the network, such as remote memory arrays and processors.

The booting of each data storage device in step 262 can engage in loading pre-boot system information like clock values, to initialize device operation, such as with self-diagnostic tests and evaluations. With clock values being provided by the auxiliary controller, each data storage device can conduct time dependent booting applications that otherwise would have to wait for an upstream network time server to be online and connect with each device or be predicted, which can result in wasted system processing and increased error rates. Step 262 can boot the data storage device by establishing a network address, such as an internet protocol address, that is similar or dissimilar from an address assigned through a dynamic host configuration protocol (DHCP). That is, step 262 can boot the data storage device by retrieving a previously issued DHCP address as well as by assigning a static network address without a DHCP address to allow device overhead operations to be conducted and the device to be online with or without upstream servers, such as a network time server, being online.

The auxiliary controller may be configured with a user port that allows personalized user data to be provided to each data storage device in a pro-boot environment, which can allow greater device function once a network connection is established. Decision 266 evaluates whether user data is present in the auxiliary controller, either from a port or in local memory. If user data is present, step 268 identifies the pre-boot data that can be loaded prior to connection with a network. The identified personalized user data is then loaded at step 270.

A lack of any pre-boot user data in the auxiliary controller or the loading of user data respectively advances routine 260 to step 272 where a synchronized connection is established between each data storage device and the host controller and network via different, independent interfaces than used to connect each data storage device to the auxiliary controller. By configuring each data storage device with independent interfaces to connect to the auxiliary controller and host controller, various embodiments can conduct steps 262 and 272 concurrently so that maximum booting efficiency is achieved and optimized data storage device function is provided immediately upon connection with the network.

With the synchronized connection between each data storage device and the host controller being established in step 272, full operation of the controller and data storage devices can begin by conducting startup operations in each data storage device in step 274, such as BIOS instructed activities. Such startup operations advance to step 276 where at least one operating system is loaded in both the host controller and each data storage device. The operating system may be present in a multitude of places in the network and call upon one or more other network components to provide network function. For example, an operating system may be present in a centralized network server and utilized by a remote data storage device to provide data and function to other clients via wired or wireless connections.

Through the various steps and decisions of routine 260, independent data storage device interfaces can allow optimized network booting by providing pre-boot system information to each data storage device prior to connection to a host controller and network. It should be noted that the various steps and decisions of routine 260 are not required or limited and can be modified at will. For instance, an additional step of querying the auxiliary controller for pre-boot system information like clock values and personalized user data may be conducted prior to decision 266.

The ability to provide pre-boot system information to one or more data storage devices with an interface independent from a host controller can allow device booting and preparation operations to be conducted prior to connection with a network and host controller. Increased booting accuracy and readiness can be achieved in each data storage device through the supply of pre-boot system information from an auxiliary controller. Moreover, the utilization of an auxiliary controller in a common chassis with a host controller can allow each data storage device to operate as a micro-server without having to house equipment, like independent real time clock generating means and a power source, to supply system information.

It is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. An apparatus comprising a data storage device having independent first and second interfaces respectively connecting the data storage device to a host controller and an auxiliary controller, the auxiliary controller configured to provide pre-boot system information to the data storage device prior to a synchronized connection between the data storage device and the host controller.

2. The apparatus of claim 1, wherein the data storage device comprises at least one rotating data storage medium.

3. The apparatus of claim 1, wherein the data storage device comprises a cross-point array of solid state memory cells.

4. The apparatus of claim 1, wherein the auxiliary controller is connected in parallel with multiple separate data storage device.

5. The apparatus of claim 1, wherein the auxiliary controller comprises local memory configured to temporarily store data from a user access port.

6. The apparatus of claim 1, wherein the first interface comprises a first protocol.

7. The apparatus of claim 6, wherein the second interface comprises a second protocol, the first and second protocol being different and the first and second interfaces being different.

8. The apparatus of claim 1, wherein the host controller, data storage device, and auxiliary controller are physically positioned within a common chassis.

9. A method comprising:
   connecting independent first and second interfaces of a data storage device respectively with a host controller and an auxiliary controller; and
   providing pre-boot system information to the data storage device from the auxiliary controller prior to a synchronized connection between the data storage device and the host controller.

10. The method of claim 9, wherein the pre-boot system information is a real time clock value.

11. The method of claim 10, wherein the real time clock value is exclusively received from the auxiliary controller prior to the synchronized connection with the host controller.

12. The method of claim 9, wherein the first and second interfaces are different types of bus protocols.

13. The method of claim 9, wherein the data storage device is connected to both the host controller and auxiliary controller concurrently and without the host controller and auxiliary controller being directly connected.

14. The method of claim 9, further comprising temporarily storing data from a user access port on local memory, wherein the auxiliary controller comprises the local memory, and wherein the data comprises personalized network address information.

15. The method of claim 9, wherein the provided pre-boot system information loads a real time clock protocol in the data storage device.

16. A method comprising:
   connecting independent first and second interfaces of a data storage device respectively with a host controller and an auxiliary controller;
   providing pre-boot system information to the data storage device from the auxiliary controller prior to a synchronized connection between the data storage device and the host controller; and
   confirming a connection between the data storage device and a network via the host controller subsequent to the synchronized connection being established.

17. The method of claim 16, wherein the auxiliary controller provides a first real time clock value and the network provides a second real time clock value.

18. The method of claim 17, wherein the first and second real time clock values are the same.

19. The method of claim 17, wherein the first and second real time clock values are different.

20. The apparatus of claim 17, wherein the first real time clock value is present in the absence of the second real time clock value.

* * * * *